United States Patent [19]

Reckweg et al.

[11] Patent Number: 5,340,600
[45] Date of Patent: Aug. 23, 1994

[54] LOW FAT SPREAD WITH NON-PROTEINACEOUS CRYSTAL INHIBITORS

[75] Inventors: Freek Reckweg, Columbia; Michael Chiaverini, Towson; Scott A. Lehouiller, Catonsville, all of Md.

[73] Assignee: Van Den Bergh Foods Company, Division of Conopco, Inc., Lisle, Ill.

[21] Appl. No.: 18,665

[22] Filed: Feb. 17, 1993

[51] Int. Cl.$^5$ ................................................ A23D 7/00
[52] U.S. Cl. .................................... 426/603; 426/602; 426/604; 426/656
[58] Field of Search ................ 426/602, 603, 604, 656

[56] References Cited

U.S. PATENT DOCUMENTS

| | | | |
|---|---|---|---|
| 3,360,377 | 12/1967 | Spitzer et al. | 426/604 |
| 3,721,570 | 3/1973 | Linteris | 426/604 |
| 3,946,122 | 3/1976 | Scharp | 426/604 |
| 4,087,565 | 5/1978 | Ebskamp | 426/603 |
| 4,115,598 | 5/1978 | Moran | 426/604 |
| 4,160,850 | 7/1979 | Hallstrom et al. | 426/601 |
| 4,273,790 | 6/1981 | Bosco et al. | 426/335 |
| 4,273,795 | 6/1981 | Bosco et al. | 426/602 |
| 4,279,941 | 7/1981 | Bosco et al. | 426/602 |
| 4,292,333 | 9/1981 | Bosco et al. | 426/335 |
| 4,446,165 | 5/1984 | Roberts | 426/602 |
| 4,468,408 | 8/1984 | Bosco et al. | 426/604 |
| 4,632,841 | 12/1986 | Parke et al. | 426/604 |
| 4,818,553 | 4/1989 | Hoscher et al. | 426/549 |
| 4,883,681 | 11/1989 | Ernsting . | |
| 5,151,290 | 9/1992 | Norton et al. . | |
| 5,160,759 | 11/1992 | Nomura et al. | 426/602 |
| 5,178,897 | 1/1993 | Tanaka et al. | 426/602 |

FOREIGN PATENT DOCUMENTS

| | | |
|---|---|---|
| 31380/89 | 9/1989 | Australia . |
| 279498 | 8/1988 | European Pat. Off. . |
| 430180 | 6/1991 | European Pat. Off. . |
| 430329 | 6/1991 | European Pat. Off. . |
| 89/07893 | 9/1989 | PCT Int'l Appl. . |
| 90/09107 | 8/1990 | PCT Int'l Appl. . |
| 1333938 | 10/1993 | United Kingdom . |

OTHER PUBLICATIONS

Research Disclosure vol. 327, No. 039, 1991, Emsworth, Great Britian.

*Primary Examiner*—Helen Pratt
*Attorney, Agent, or Firm*—A. Kate Huffman

[57] ABSTRACT

The present invention regards a low fat spread comprising from about 30 to about 40 wt. % of a continuous fat phase and about 60 to about 70 wt. % of an aqueous phase. The fat phase further comprises a non-proteinaceous fat crystallization inhibitor in an amount of less than 0.5 wt. % and a non-proteinaceous emulsifier. The aqueous phase contains a dairy protein in an amount of less than about 0.1 wt. %.

8 Claims, No Drawings

LOW FAT SPREAD WITH NON-PROTEINACEOUS CRYSTAL INHIBITORS

FIELD OF THE INVENTION

This invention pertains to protein containing products having less than or equal to 40% fat which exhibit long term storage stability based on a non-proteinaceous crystalline system without the need to stabilize the milk phase with thickeners or gelling agents.

BACKGROUND OF THE INVENTION

Fat spreads such as butter and margarine having 40% and less fat while desirable have been observed to suffer from severe emulsion instability after prolonged storage at refrigerator temperature. Pools of oil and moisture were observed in such products. It is believed that the fat of the products re-crystallized upon storage causing the emulsion instability problem.

It is known in the art that removing milk proteins from the aqueous phase of low fat spreads can address stability problems. However, removing the milk proteins from the compositions causes an unacceptable oral response and stable products in the presence of milk proteins require the presence of a thickening or a gelling agent in the aqueous phase. Suitable gelling agents such as gelatin, however, adversely effect taste and are rather more expense to process than margarines processed on so-called traditional processing lines as higher hygiene standards are required.

It was thus observed that low fat spread products having long term stability for up to at least 5 weeks when stored at 5° C. could be provided. Such products contain less than 0.5 wt. % of a non-proteinaceous fat recrystallization inhibitor in combination with less than 0.1 wt. % milk protein, without the addition of a proteinaceous emulsifier.

SUMMARY OF THE INVENTION

It is an object of the invention to provide a low fat spread having long term stability and comprising a oil-continuous emulsion, less than 0.1 wt. % milk protein, and less than 0.5 wt. % of a non-proteinaceous fat crystallization inhibitor.

It is another object of the invention to avoid the use of a gelling agent, such as gelatin, or thickener to provide a spread which is stable upon long term storage.

Another object of the invention is to provide low fat spreads having good oral response, mouthfeel and melt without specialized and expensive processing equipment.

DETAILED DESCRIPTION OF PREFERRED EMBODIMENTS

Oil Phase

The products of the invention have a smooth texture, rich mouthfeel and excellent long term stability.

The term "long term stability" or "prolonged storage stability" means that the product does not exhibit destabilization caused by fat recrystallization or post crystallization after storage at about 5° C. for at least five weeks. Fat recrystallization or post crystallization destabilization is evidenced by oil or moisture separating from the product.

The fat of the composition will be present in amounts within the range of up to or equal to 40% based on the weight of the spread, preferably in a range of about 30 to 40%, most preferably 35 to 40% of the spread.

Vegetable oils which may be included in the composition are the usual vegetable oils such as soybean oil, corn oil, cottonseed oil, peanut oil safflower oil, sunflower oil and rapeseed. The preferred fats are hydrogenated liquid and vegetable oils selected from the group of safflower oil, soybean oil, corn oil, rapeseed oil and mixtures thereof. Especially preferred is soybean oil.

A non-proteinaceous fat crystallization inhibitor is added to the composition in an amount of less than 0.5 wt. %, preferably 0.05 to 0.2 wt. %, most preferably 0.05 to about 0.1 wt. %. The inhibitors should have a hydrophilic/lipophilic balance (HLB) of 5 to 10, preferably 5 to 8. Suitable inhibitors include polyglycerol esters, sorbitan esters, and any other fat crystallization inhibitors known in the art having the required HLB range and being food grade for use in spread products.

The preferred inhibitor is polyglycerol ester and the most preferred polyglycerol esters are those containing fatty ester groups, preferably stearate esters. An example of a suitable fat crystallization inhibitor is a polyglycerol ester known as Santone 3-1-SH having an HLB of 7 supplied by Van den Bergh of Lisle, Ill. Without being limited by theory, the fatty esters of the inhibitor agents interact with the oil ingredients of the oil phase to prevent post or re-crystallization of fat during storage. Inhibitors having a low HLB of e.g. 2 or less provide stable products, however, change the melting point of the product to adversely effect its mouthfeel as the water-in-oil emulsifying effect becomes the primary effect of the inhibitor. Conversely, inhibitors having a high HLB, e.g. greater than 10, effect the emulsion stability of the products. While the oil-in-water effect of these high HLB additions becomes too strong to maintain stable oil continuous emulsions.

Products of the present invention not only exhibit stability upon prolonged storage but also exhibit excellent spreadability scores upon cycling temperatures of between 5° C. and ambient temperatures (20° C. back to 5° C.) and furthermore show excellent spreadability scores at ambient temperatures after at least 5 weeks.

Emulsifiers used in the fat phase of the present spread include saturated and unsaturated monoglycerides, diglycerides, phosphatides and lecithin. Preferably the emulsifiers are present in an amount of 0.1 to 0.4 wt. % of the composition.

Preferably the emulsifier system comprises a mixture of saturated and unsaturated monoglycerides, preferably in a ratio of 1:1 unsaturated to saturated monoglycerides. Such a mix of the monoglycerides provide products having good long term stability.

Aqueous Phase

The present compositions must not contain more than 0.1 wt. % of a dairy protein, preferably about 0.005 to less than 0.1 wt. %, most preferably 0.005 to 0.02 wt. %. The amount of the dairy protein ingredient is critical to provide a good tasting, and excellent mouthfeel product. The dairy protein can be derived from any dairy source, such a whole milk, skin milk, cultured buttermilk, buttermilk powder, skim milk powder, yogurt, quark, frommage, whey powder, butter, etc. A preferred dairy source is whey powder.

Non-dairy ingredients may also be present in the composition such as vegetable proteins e.g. soybean extracted proteins.

The compositions of the invention may comprise a number of optional ingredients to provide desirable flavor and color as known in the art.

Flavors which are suitable include sodium chloride, butter flavors, fruit flavors, spices, nut flavors, vegetable flavors, herbs, dairy flavors, distilled beverage flavors, cheese flavors, seafood flavors, meat flavors, candy flavors, etc. as known in the art.

Preferably the level of flavoring materials is less than 0.5 wt. %, more preferably 0.01 to 0.2 wt. %.

Preferably the level of sodium chloride is from 0 to 4 wt. %, more preferred 0.1 to 3 wt. %, most preferred 0.5 to about 2 wt. %.

Colors which are suitable include beta-keratene, annatto, turmeric, caramel color, paprika and FD&C dyes. Typically the colors will be dissolved or dispersed in the fat phase or the water phase to expedite blending. Colors are present in the composition in an amount of less than 1 wt. %, preferably 0.001 to 0.1 wt. %.

To control microbiological and oxidative deterioration, preservatives are incorporated in the composition to control mold and yeast growth, the products may contain benzoic acid, sorbic acid, phosphoric acid, lactic acid and the soluble salts of these and other materials.

Preferred anti-microbials are potassium sorbate, sodium sorbate, potassium benzoate, sodium benzoate and phosphoric acid preferably incorporated at a level of up to 4 wt. %, more preferably 0.01 to 2 wt. %. Especially preferred is potassium sorbate.

Acidifiers may be incorporated to maintain the pH of the aqueous phase of the product at a desirably level, preferably from 3 to 10, more preferably from 3.5 to 7. Suitable acidifiers are lactic acid and citric acid incorporated at a level of about 0.01 to 1 wt. %, preferably 0.01 to 0.1 wt. %.

If desired, a chelating agent such a EDTA add salts so the light can be employed to tie up metal ions which may otherwise interact with one or more of the ingredients in an undesirable manner.

Processing

The compositions of the invention are processed generally by passing through a combination of a scraped surface heat exchangers and pin stirred crystallizers. The first process unit operator step preferably utilizes a scraped surface heat exchanger plus high speed phase invertor where the invertor is a crystallizer.

In the preferred embodiment, the process sequence is A-A-C-A-C. Preferably, a plate heat exchanger (PHE) is utilized prior to the first cooling A step to provide process temperatures.

Specifically, the oil phase is prepared by blending a liquid vegetable oil and selected emulsifiers with heat in a temperature range of from about 150° to 170° F. under agitation. The resulting mixture is then cooled to a range of about 110° to about 140° F. and lecithin is then added, preferably with agitation to form the oil phase. The aqueous phase is prepared by heating water to about 150° to 170° F. and subsequently adding all dry ingredients except sodium chloride to the heated water. The resulting mixture is then cooled to a temperature range of about 110° to about 140° F. The salt is then added to the cooled mixture with agitation. Remaining water, dairy protein source and acidifying agent is then added to the mixture to form the aqueous phase.

Premixing of the aqueous and oil phase is accomplished by adding the complete oil phase to the aqueous phase under continuous agitation. The phases are agitated to homogenize the aqueous and oil phases and optional ingredients such as flavors and colors may be added during the homogenization agitation.

The premix mixture passes from the homogenizer to a suitable heat exchanger where it is cooled. The following examples illustrate, without limitation, the present invention.

Unless otherwise indicated, wt. % means the percentage of the ingredient based on the total composition.

EXAMPLE 1

The following 40% fat spread products were prepared:

| FORMULATIONS | COMPOSITIONS A-E | | | | |
|---|---|---|---|---|---|
| | A | B | C | D | E |
| OIL PHASE | | | | | |
| 78% liquid soybean oil/ 22% soy oil hardened to 42° C. | 39.55 | 39.475 | 39.45 | 39.45 | 39.35 |
| Distilled saturated monoglycerides | 0.175 | 0.325 | 0.225 | 0.175 | 0.175 |
| Distilled unsaturated monoglycerides | 0.175 | | 0.225 | 0.175 | 0.175 |
| Polyglycerol ester | | | | 0.1 | 0.2 |
| Lecithin | 0.1 | 0.2 | 0.1 | 0.1 | 0.1 |
| AQUEOUS PHASE | | | | | |
| Whey powder | 0.10 | 0.10 | 0.10 | 0.10 | 0.10 |
| Lactic acid | 0.07 | 0.07 | 0.07 | 0.07 | 0.07 |
| Water | 58.5 | 58.5 | 58.5 | 58.5 | 58.5 |
| Potassium Sorbate | 0.1 | 0.1 | 0.1 | 0.1 | 0.1 |
| EDTA | 0.007 | 0.007 | 0.007 | 0.007 | 0.007 |
| Flavor | 0.0125 | 0.0125 | 0.0125 | 0.0125 | 0.0125 |
| Color | 0.0066 | 0.0066 | 0.0066 | 0.0066 | 0.0066 |
| Total | 100.0 | 100.0 | 100.0 | 100.0 | 100.0 |

[1]Santone 3-1-SH supplied by Van den Bergh of Lisle, Ill. having an HLB of 7.

The EDTA and potassium sorbate were added to about 6% of the water and heated to a temperature of 175° F. to pasteurize the solution. The solution was then cooled to 140° F. and the sodium chloride was added for agitation for 10 minutes. The remainder of the water and the whey concentrate were added to the pasteurized salt containing solution. The lactic acid was added with agitation for 5 minutes to obtain a pH of 4.4.

The oil phase was prepared by heating the soybean oil, the monoglycerides and polyglycerol ester to 170° F. The heated oil solution was cooled to 140° F. and lecithin was added with mixing for 20 minutes.

The complete oil phase, color and flavor were premixed into the aqueous phase with agitation to form a homogenized composition.

The homogenized composition was then passed through scraped surface heat exchangers and crystallizers and cooled to a temperature in a range of 40° to 50° F. The cooled composition was then filled into tubs and stored at 41° F. (5° C.). The compositions were observed for spreadability and stability for at least 2 weeks at 5° C. storage.

It was observed that compositions A–C which did not contain the non-proteinaceous crystallization inhibitor (polyglycerol ester) lost stability after 10 days at 5° C. storage. Additionally, the compositions were observed to have poor spreadability (scores 2, 3 on a scale of 1–10) where 10 means excellent spread, no loose oil and water upon spreading and I means extreme emulsion destabilization upon spreading resulting in loose water droplets.

The inventive compositions D and E containing 0.1% and 0.2%, respectively, polyglycerol ester were observed to have excellent spreadability with scores of 9 and 10 which were maintained even after 10 days of storage at 5° C. Additionally, the compositions D and E have been observed to be stable at 5° C. for about 6 months.

EXAMPLE 2

| FORMULATIONS | COMPOSITIONS F-I | | | |
| --- | --- | --- | --- | --- |
|  | F | G | H | I |
| OIL PHASE |  |  |  |  |
| 78% liquid soybean oil/ 22% soy oil hardened to 42° C. | 39.45 | 39.45 | 39.45 | 39.45 |
| Distilled saturated monoglycerides | 0.175 | 0.175 | 0.175 | 0.175 |
| Distilled unsaturated monoglycerides | 0.175 | 0.175 | 0.175 | 0.175 |
| Polyglycerol ester | 0.1 | 0.1 | 0.1 | 0.1 |
| Lecithin | 0.1 | 0.1 | 0.1 | 0.1 |
| AQUEOUS PHASE |  |  |  |  |
| Water | 58.5 | 58.45 | 58.4 | 58.2 |
| Salt | 1.25 | 1.25 | 1.25 | 1.25 |
| Whey powder | 0.05 | 0.1 | 0.2 | 0.4 |
| Lactic acid | 0.07 | 0.07 | 0.07 | 0.7 |
| Potassium sorbate | 0.1 | 0.1 | 0.1 | 0.1 |
| EDTA | 0.007 | 0.007 | 0.007 | 0.007 |
| Flavor | 0.0125 | 0.0125 | 0.0125 | 0.0125 |
| Coolor | 0.0066 | 0.0066 | 0.0066 | 0.0066 |
| Total | 100.0 | 100.0 | 100.0 | 100.0 |

Compositions F–I were prepared as describe in Example 1 except the amount of whey powder was varied from 0.05 to 0.4, respectively.

It was observed that compositions F & G, containing 0.05% and 0.1% whey, respectively, had excellent spreadability scores of 10.

Composition H containing 0.2 wt. % whey powder had a reduced spreadability score of 5.

Composition I containing 0.4% whey powder had an low spreadability score of 3.

It was thus observed that compositions containing more than about 0.2% whey powder had low spreadability and the total protein content level is critical.

We claim:

1. An edible spread consisting essentially of:
   (a) about 30 to about 40 wt. % of a fat phase containing 0.05 to 0.5 wt. % based on total composition of a non-proteinaceous fat crystallization inhibitor having an HLB value of 5 to 10 and up to about 0.4 wt. % of a non-proteinaceous emulsifier system; and
   (b) about 60 to about 70 wt. % of an aqueous phase having about 0.005 to less than about 0.1% of a dairy protein, wherein the spread composition is stable for at least 5 weeks at 5° C.

2. A spread composition according to claim 1, wherein the fat phase comprises a liquid vegetable oil selected from the group consisting of soybean oil, rapeseed oil and cottonseed oil.

3. A spread composition according to claim 1, wherein the non-proteinaceous fat crystallization inhibitor is selected from the group consisting of a polyglycerol ester and a sorbitan ester.

4. A composition according to claim 3, wherein the polyglycerol ester comprises fatty acid residues of stearate.

5. A composition according to claim 1, wherein the non-proteinaceous fat crystallization inhibitor is present in an amount of from about 0.05 to about 0.1 wt. %.

6. A composition according to claim 1, wherein the non-proteinaceous emulsifier is selected from the group consisting of saturated monoglycerides, unsaturated monoglycerides, diglycerides and phosphatides and mixtures thereof.

7. The spread according to claim 6, wherein the emulsifier system comprises a 1:1 ratio of saturated monoglycerides and unsaturated monoglycerides.

8. An edible spread composition consisting essentially of:
   (a) about 30 to about 40 wt. % of a fat phase containing 0.1 to 0.5 wt. % of a non-proteinaceous fat crystallization inhibitor having an HLB value of 5 to 10 and up to about 0.4 wt. % of a non-proteinaceous emulsifier; and
   (b) about 60 to about 70 wt. % of an aqueous phase having about 0.005% to about 0.1% of a dairy protein, wherein the spread composition is stable for at least 5 wks. at 5° C. and is processed by cooling with a phase invertor between homogenizer units.

* * * * *